(12) United States Patent
Ebskamp et al.

(10) Patent No.: US 7,300,075 B2
(45) Date of Patent: Nov. 27, 2007

(54) SEALING ASSEMBLY

(75) Inventors: Lambertus Ebskamp, Lochem (NL); Nicolaas Joannes Notten, Ruurlo (NL)

(73) Assignee: Berkin B.V., Ruurlo (NL)

( * ) Notice: Subject to any disclaimer, the term of this patent is extended or adjusted under 35 U.S.C. 154(b) by 185 days.

(21) Appl. No.: 11/068,384

(22) Filed: Mar. 1, 2005

(65) Prior Publication Data
US 2005/0194783 A1 Sep. 8, 2005

(30) Foreign Application Priority Data
Mar. 3, 2004 (NL) .................................. 1025631

(51) Int. Cl.
*F16L 41/00* (2006.01)
(52) U.S. Cl. .................. 285/208; 285/206; 285/124.4; 285/124.5; 137/454.6
(58) Field of Classification Search ............ 285/124.3, 285/124.4, 124.5, 412, 206, 208, 378, 382; 137/454.6
See application file for complete search history.

(56) References Cited

U.S. PATENT DOCUMENTS

| | | | |
|---|---|---|---|
| 1,178,714 A * | 4/1916 | Griffin ........................ 285/331 |
| 2,305,668 A * | 12/1942 | Bruno ......................... 285/331 |
| 2,548,023 A * | 4/1951 | Hord ........................... 285/191 |
| 2,746,486 A * | 5/1956 | Gratzmuller ................ 285/363 |
| 3,488,070 A * | 1/1970 | Amiot et al. .......... 285/148.19 |
| 4,687,017 A | 8/1987 | Danko et al. |
| 5,284,320 A * | 2/1994 | Michael et al. ............ 251/304 |
| 5,346,138 A | 9/1994 | Ridenour |
| 5,553,902 A * | 9/1996 | Powers ....................... 285/350 |
| 5,771,919 A * | 6/1998 | Itoi et al. ................. 137/454.6 |
| 6,010,163 A | 1/2000 | Cerruti |
| 6,805,384 B1 * | 10/2004 | Wiser ......................... 285/354 |
| 6,832,762 B2 * | 12/2004 | Jost ............................. 277/602 |
| 6,893,052 B2 * | 5/2005 | Wildermuth et al. ....... 285/205 |
| 6,994,380 B2 * | 2/2006 | Cooke, Jr. .................. 285/354 |
| 2003/0184084 A1 | 10/2003 | Winship |

FOREIGN PATENT DOCUMENTS

| | | |
|---|---|---|
| DE | 846043 | 8/1952 |
| DE | 1038353 | 9/1958 |
| GB | 735660 | 8/1955 |
| GB | 1 220 856 | 1/1971 |

* cited by examiner

*Primary Examiner*—David Bochna
(74) *Attorney, Agent, or Firm*—Young & Thompson

(57) ABSTRACT

Sealing assembly, for example forming part of a flowmeter. The sealing assembly comprises a first metal body with a mating surface in which a centering chamber with a flat bottom and an upright wall are provided, and a second metal body with a mating surface provided with an annular collar having a narrowed end and a centering surface that bears on the upright wall of the chamber. Bolts couple the two bodies in a detachable manner under deformation of the collar such that the mutually facing mating surfaces do not touch each other.

12 Claims, 6 Drawing Sheets

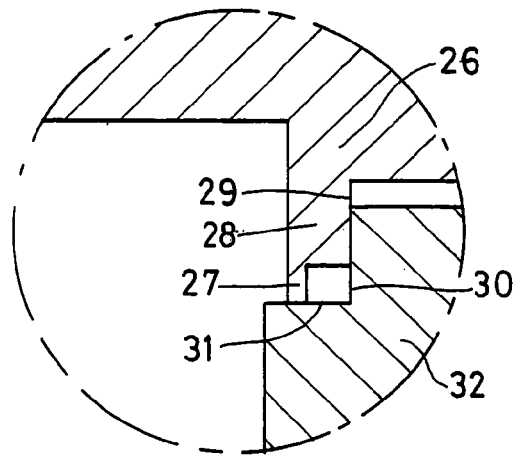 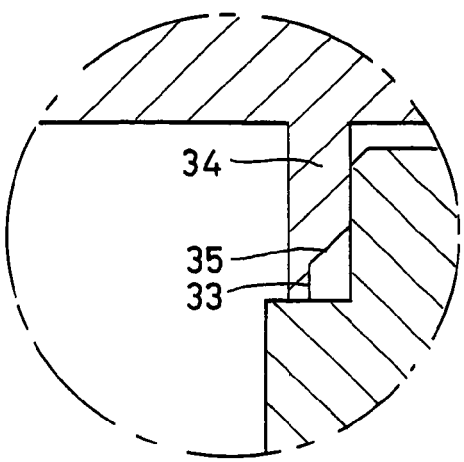
FIG.8A  FIG.8B
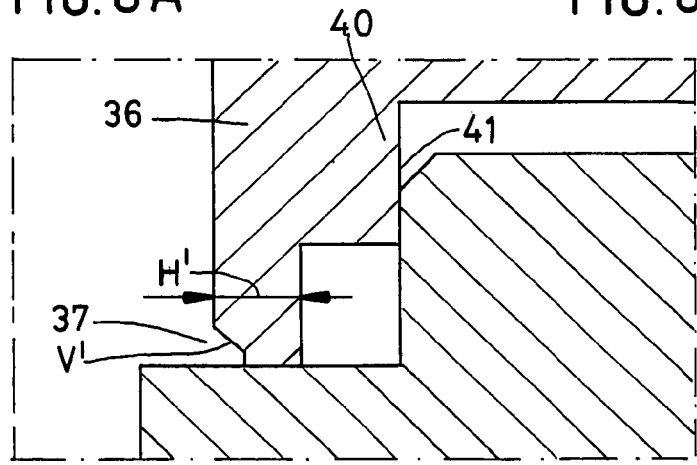
FIG.8C
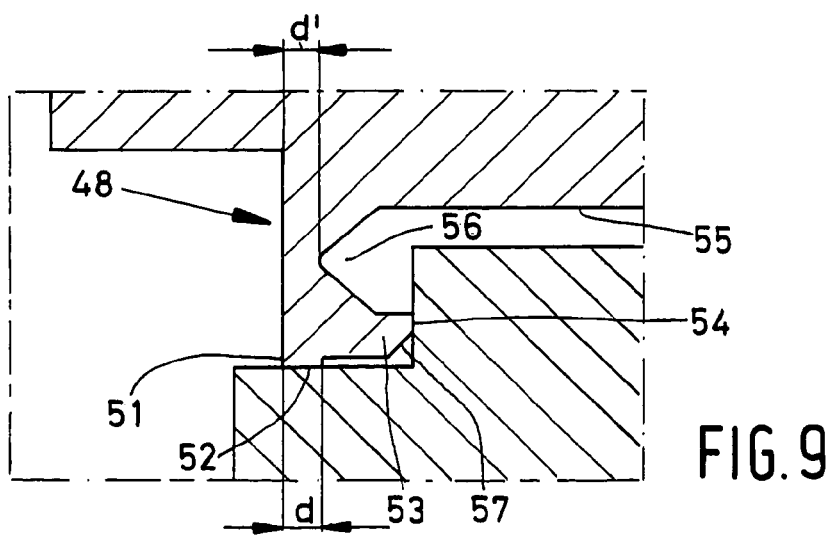
FIG.9

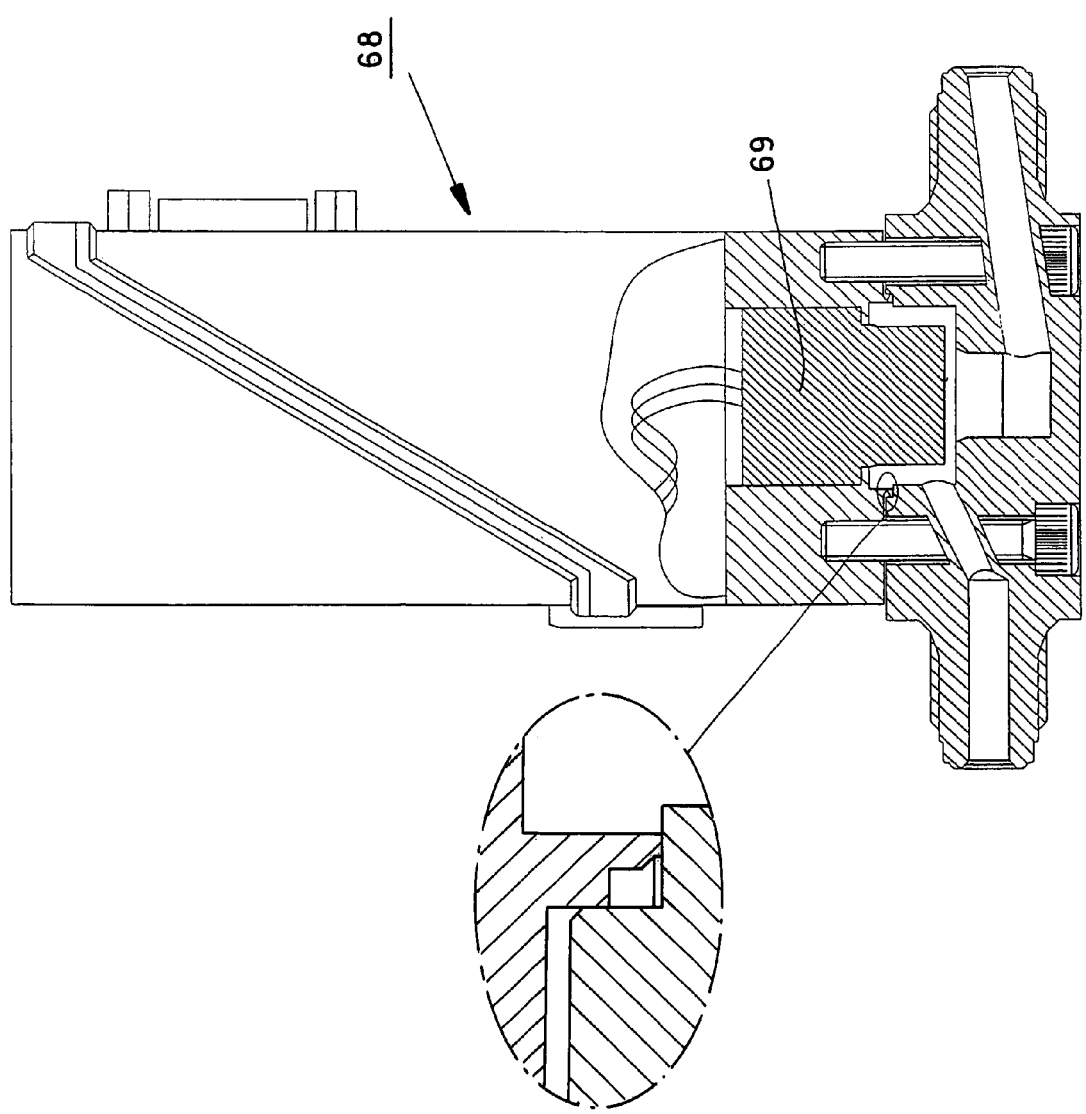

SEALING ASSEMBLY

FIELD OF THE INVENTION

The invention relates to a sealing assembly comprising a first metal body with a first sealing surface, a second metal body with a second sealing surface, and coupling means for detachably coupling the first and the second body to one another under axial compression.

The invention relates in particular to a device for controlling, in particular measuring and regulating gas or liquid flows (a so-termed fluid control device) in which such a sealing assembly is used.

BACKGROUND OF THE INVENTION

U.S. Pat. No. 4,687,017, for example, discloses a fluid control device in the form of a control valve in which a sealing assembly of the general type described above is used. The device described therein comprises a valve body with a valve chamber that is open at one end. A closing piece with a flange of enlarged diameter is placed over the open end. To achieve the seal between the flange and the valve body, the flange is provided with a rounded annular bead seal along its circumference at the lower side. The (rounded) bead seal is in contact with a planar shoulder formed at the valve body. An internally threaded gland nut cooperates with a screw thread externally provided on the valve body so as to exert an axial compression force on the bead seal. Although a reasonable degree of sealing can indeed be achieved with the above construction without the use of an 0-ring, it was found in practice that that the construction is not satisfactory if the components are to be detached from one another and fastened again a number of times (so-termed re-assembly). This, however, may be useful both during production and during maintenance.

OBJECT OF THE INVENTION

The invention has for its object to provide an assembly of the kind described in the opening paragraph which renders possible said re-assembly a number of times while leakage is still effectively prevented.

SUMMARY OF THE INVENTION

A sealing assembly according to the invention is for this purpose characterized in that the first body, in a mating surface thereof, is provided with a rounded centering chamber with a flat bottom and an upright wall, which bottom constitutes the first sealing surface, and in that the second body is provided with an annular collar raised from a mating surface, which collar has an inner and an outer wall and a narrowed end with a flat end face that forms the second sealing surface, wherein the outer wall of the collar has a centering surface that abuts against the upright wall of the centering chamber in the first body, and wherein the coupling means couple the first and the second body to one another. Coupling under axial compression has the result in particular that the narrowed end of the collar, and possibly also other portions of the collar, are deformed. The narrowed end bulges outwards during this.

The effect of the sealing assembly according to the invention is based on the recognition that on the one hand the combination of centering chamber and centering surface of the collar safeguards the reproducibility of the positions of the components relative to one another in the case of re-assembly, while on the other hand the force to be applied to the coupling means in a number of consecutive re-assembling operations can be dosed such that the collar is plastically deformed, but a partial plastic deformation remains available a number of times, thanks to the shape given to the collar (in particular, a planar instead of a rounded end face and a thickness adapted to the radius).

The effect is enhanced if, in an embodiment, the first and the second body are provided with mutually cooperating alignment means at the outer side of the centering chamber so as to guarantee that the relative positions of the first and the second body are reproducible upon re-assembly, so that in particular circular segments of the mutually facing surfaces of the first and the second body will always contact one another in the same locations.

The outer wall of the collar may itself act as the centering surface, but an embodiment of the sealing assembly according to the invention is characterized in that the collar comprises a portion that projects radially outwards, at which portion the centering surface is formed. An advantage of this is that the projecting portion at the same time acts as a reinforcement. The alignment means may comprise one or more alignment pins in the one body entering into matching holes in the other body, for example in combination with a gland nut serving as the coupling means. A preferred embodiment of the invention, however, is characterized in that the alignment means comprise a number of bolt holes in the first and second bodies, which holes are mutually aligned in pairs, with bolts passed through them so as to form the coupling means. To prevent the components from being mounted misaligned by 180° with respect to their initial positions, a visual mark may be provided indicating the correct, non-rotated positions, or the bolt holes may be arranged asymmetrically with respect to their chamber center. In the design according to the invention, the collar has in particular a narrowed end with a wall thickness of between 0.1 and 5 mm. The thickness will be greater in proportion as the collar diameter is greater.

The narrowed end of the collar will also often be denoted the "seal" hereinafter. The required compression force for the seal depends inter alia on:
1. the degree of leakage resistance desired;
2. the surface roughness of the prepared surfaces.

If a sufficient compression is applied to the sealing surface, a leakage resistance better than $2\times10^{-9}$ mbar l/s can be achieved. It is possible in particular to detach the sealing assembly three times and to fasten it again three times with substantially the same tightening torque applied to the bolts for the same leakage resistance. The sealing assembly according to the invention can be detached at least eight times with a slight torque increase of 10 to 15% in re-assembly.

The contact surfaces preferably have a surface roughness of at most 0.6 µm $R_a$ max for this purpose.

The sealing assembly collar according to the invention having a centering surface provided on a radially projecting portion may have in various embodiments.

A first, simple embodiment is characterized in that the projecting portion of the annular collar at which the centering surface is formed extends from the narrowed end up to the mating surface.

A modified version which is simple as well as deformable without the risk of buckling is characterized in that the radially projecting portion merges into the narrowed end via a sloping surface. Although the transition via a sloping surface is more favorable in view of buckling than a perpendicular surface, this modified version still involves the risk that the centering surface, since it is formed at a projecting portion, gets jammed in during tightening of the bolts. To prevent this, a further embodiment is characterized in that an intermediate portion with an intermediate wall thickness is provided between the projecting portion and the narrowed end. Preferably, the intermediate portion merges into the narrowed end via a sloping surface to provide resistance against buckling.

An alternative embodiment is characterized in that the inner or outer wall of the annular collar is provided with a notch in radial direction between the projecting portion of the collar at which the centering surface is formed and the mating surface so as to define at least in part an effective minimum wall thickness of the collar, such that the minimum wall thickness of the collar is equal to or smaller than the minimum wall thickness of the narrowed end.

This embodiment does have the advantage that it requires comparatively little height and is accordingly compact, but a disadvantage is that it is comparatively complicated, i.e. difficult to manufacture.

The sealing assembly according to the invention, whose special feature is its extreme leakage resistance, and which can be re-assembled several times with substantially the same tightening torque, can be used to advantage in a wide variety of fluid control devices. These may be, for example, flowmeters, pressure meters, control valves (both of the normally closed type and of the normally opened type), filters, and mass flow controllers. The use of metal seals, such as those of the present invention, is of major importance particularly in the manufacture of semiconductors.

BRIEF DESCRIPTION OF THE DRAWINGS

The invention will now be explained in more detail below with reference to the drawing, in which:

FIGS. 8A, 8B, and 8C show modifications of the sealing collar of FIG. 6;

FIG. 9 shows an alternative sealing collar; and

FIGS. 10 and 11 show a filter and a pressure meter, respectively, wherein a sealing assembly according to the invention is used.

DETAILED DESCRIPTION OF THE INVENTION

Figure 1:
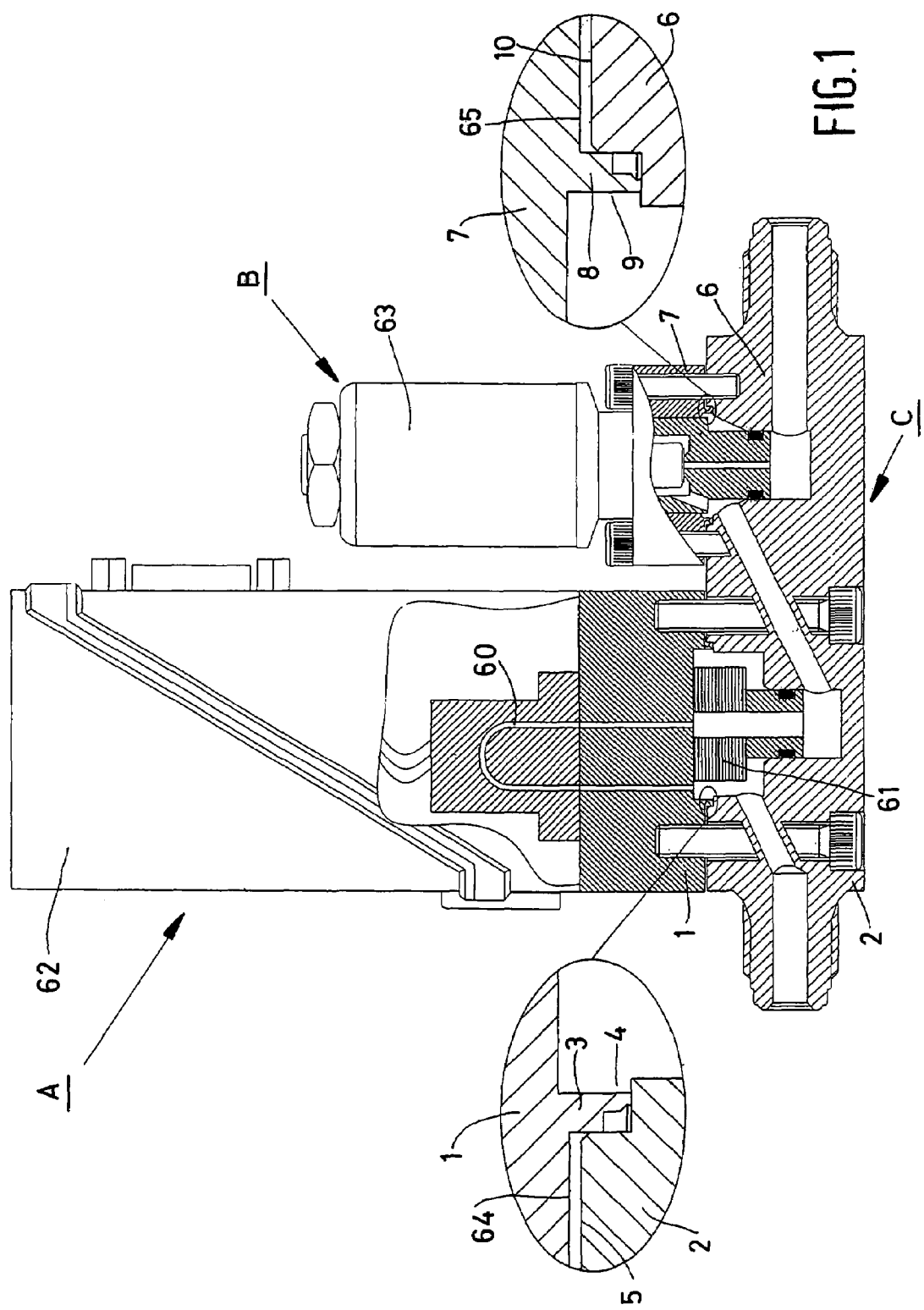
FIG. 1 is a cross-sectional view of a flow control device with a flowmeter part (left) and a control valve part (right), both provided with a sealing assembly according to the invention.

FIG. 1 shows the pressure-bearing part of a flow control device, in this case for gases, with a flowmeter part A, a control valve part B, and a common base part ("body") C. The flowmeter A comprises inter alia a U-shaped tube 60 that constitutes a thermal flow sensor and a diagrammatically depicted laminar flow element 61 connected in parallel thereto. The flowmeter A comprises a sealing assembly according to the invention with a closing piece 1 and a part 2 that forms part of the body C. The closing piece 1 has an annular collar 3 that projects in forward direction from a mating surface 6 and that fits exactly in a centering chamber 4 provided in a mating surface 5 of the part 2. All this is shown on an enlarged scale in the inset. The control valve B similarly comprises a sealing assembly according to the invention with a closing piece 7 and a part 6 that forms part of the body C. The closing piece 7 has an annular collar 8 that fits exactly in a centering chamber 9 provided in a mating surface 10 of the part 8. The closing piece 7 of the control valve B with the collar 8 is shown separately in FIG. 5. A first embodiment of the collar is shown in detail in FIG. 6.

Figure 2:
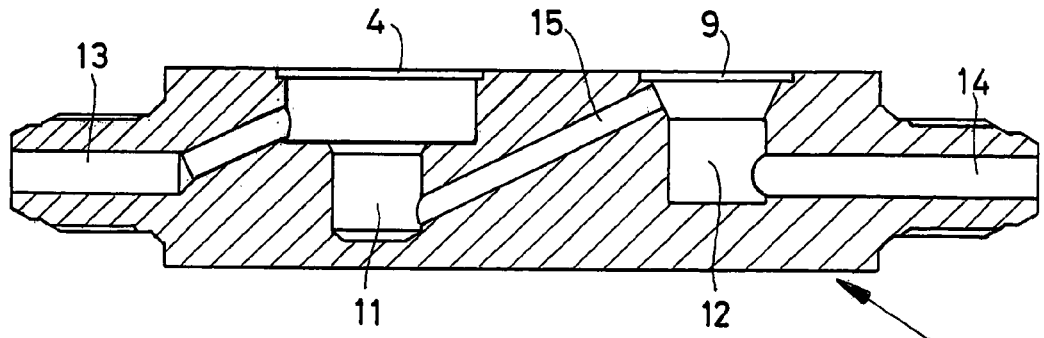
FIG. 2 is a cross-sectional view of only the lower part (the body) of the device of FIG. 1.
Figure 4:
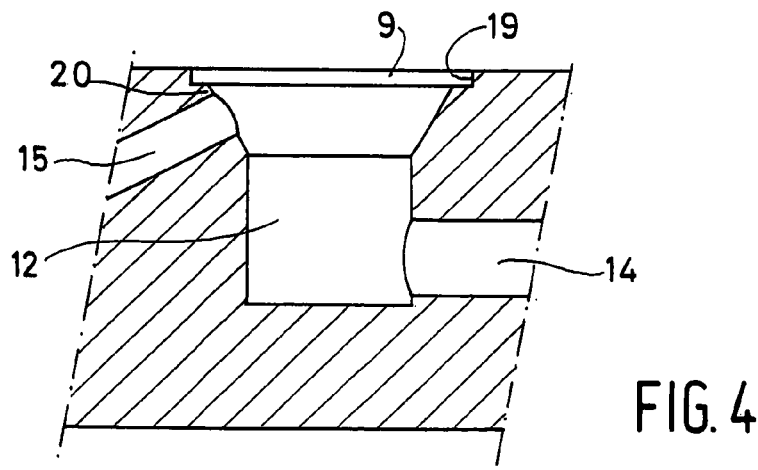
FIG. 4 is a cross-sectional view of the control valve part of the body of FIG. 2.

FIG. 2 shows the individual body C with its centering chambers 4 and 9. The centering chamber 4 has a diameter of 23.5 mm and the centering chamber 9 a diameter of 16.5 mm in this case. They are in communication with internal cavities 11 and 12, respectively, of which the cavity 11 is in communication with an inlet channel 13 and the cavity 12 with an outlet channel 14. The cavities 11 and 12 are interconnected by a channel 15. A portion of the body C with centering chamber 9 is shown in more detail in FIG. 4.

Figure 3:
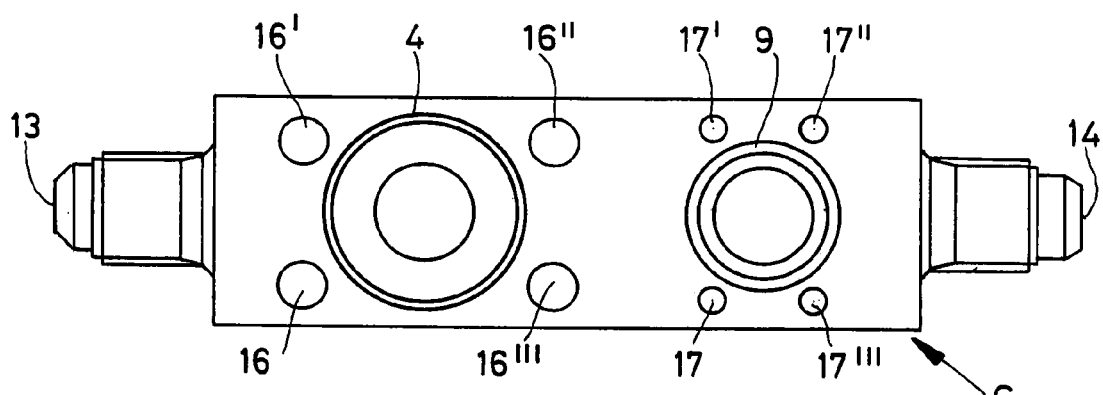
FIG. 3 is a plan view of the body of FIG. 2.

FIG. 3 shows the body C in plan view with its centering chambers 4 and 9. Four holes (located in the corner points of a rectangle) 16 . . . 16''' and tapped holes 17 . . . 17''', into which twice four bolts can be fitted that connect the various parts in a detachable manner, are present at the outer side of each centering chamber.

Figure 5:
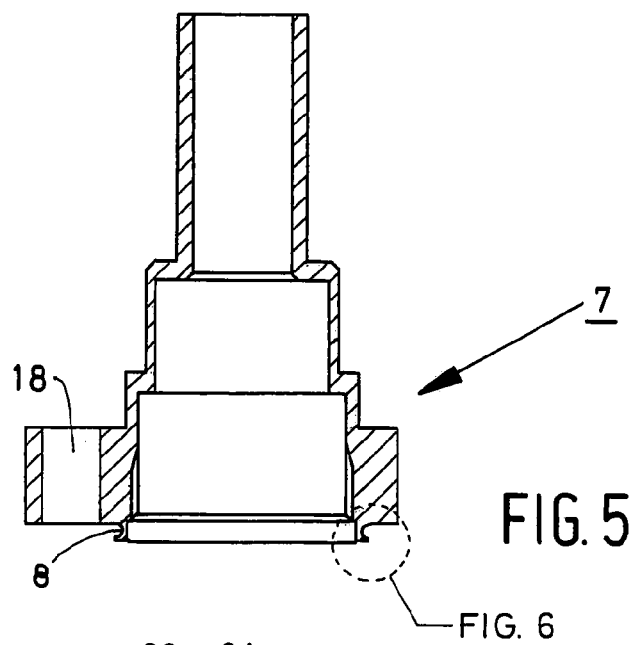
FIG. 5 is a cross-sectional view of part of the upper portion of the control valve of FIG. 1.
Figure 7:
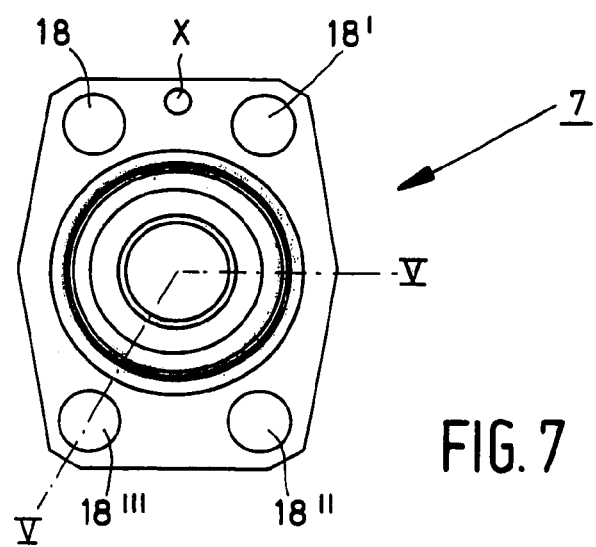
FIG. 7 is a bottom view of the upper portion of the control valve that forms part of the device of FIG. 1.

FIG. 7 is a plan view of the closing piece 7 of the control valve B shown in cross-section in FIG. 5. This closing piece has four holes 18 . . . 18''' that correspond with the holes 17 . . . 17''' in the body C.

The closing piece 1 with the collar 3 of greater diameter is coupled to the body C under compression force by means of four M5 bolts. The closing piece 7 with the collar 8 of smaller diameter is coupled to the body C under compression force by means of four M4 bolts. The closing piece 7 is provided with a visual alignment mark X that serves to prevent the components from being joined together while rotated through 180° relative to one another. An alternative is to provide the holes asymmetrically with respect to their chamber center.

Figure 6:
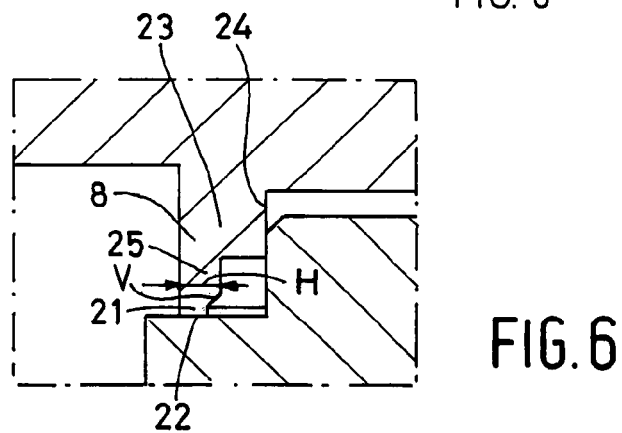
FIG. 6 is an enlarged-scale sectional view of the circled portion in FIG. 5 with a sealing collar in a first embodiment thereof.

The following can be remarked on FIG. 6, which shows the collar 8 in cross-section. The collar 8 has a narrowed end 21 (the "seal") with a flat end face 22. A centering surface 24 is formed at a portion 23 that projects radially outwards. An intermediate portion 25 with an intermediate wall thickness H is situated between the projecting portion 23 and the narrowed end 21. The portion 23 having the greatest wall thickness comprises the centering surface 24, because the portion 23 will not be deformed when the bolts are tightened, whereas the portion 25 having the smaller wall thickness will.

The sloping surface V along which the portion 25 merges into the end 21 is useful in preventing buckling of the collar. It preferably encloses an angle of 35 to 55° with the collar wall.

Given a seal diameter of 23.5 mm and a maximum working pressure of 100 bar, a seal width of 0.3 mm will suffice. In other words: at a load of 100 bar, the packing pressure owing to stretch of the bolts and bending of the pressure piece is sufficient. For seal diameters above 25 mm, given the same working pressure of 100 bar, it is preferable to increase the seal width. It should be possible to pretension the bolts sufficiently for retaining a sufficient packing pressure at 100 bar in order to keep the bolts slim. The packing pressure, however, must not exceed 900 N/mm² during assembling, hence the desired greater seal width.

This may be clarified with the following example. The seal width should be approximately 0.6 mm for a seal diameter of approximately 50 mm at a maximum working pressure of 100 bar, i.e. greater by a factor 2 than the dimension for a seal diameter of 23.8 mm. A planarity of 0.02 mm is achievable by means of turning for diameters from 40 mm to 150 mm. Since the planarity of the sealing surfaces at these diameters is greater by a factor 2 than at diameters below 25 mm, the deformability of the seal must also be greater by a factor 2. This means that the seals become higher by a factor 2.

A surface can be made satisfactorily flat to within 0.01 mm by means of a lathe in a commercially acceptable manner nowadays, provided the diameters are not too great. This implies that the seal must flow by at least 0.02 mm in the case of a good, "economical" seal so as to keep the reject percentage low in production. The deformations in a collar with a height of approximately 2 mm and a width of 0.3 mm were measured after tightening of the bolts (with the same tightening torque each time) and loosening again: the first two or three times the collar is deformed by approximately 0.035 mm; at the fourth time the collar is deformed by approximately 0.025 mm; at the fifth time by 0.015 mm; and at the sixth to tenth times by approximately 0.01 mm. This means that the collar can be sealed tight four times with a high degree of certainty if it is tightened in a random rotational orientation. If the collar is given the same rotational orientation, it can be sealed ten times. It was also measured that the collar bulges outwards. Its diameter becomes 0.01 mm wider in each assembling step.

Suitable metals for the collar are soft steel types and metals. Stainless steel, monel, and hastelloy as well as, for example, nickel alloys with copper, aluminum, zinc, and with other metals are eligible. Nickel-copper alloys are often called monel and are composed of approximately 65% nickel and 35% copper by weight. Most hastelloys belong to the nickel-molybdenum group. Hastelloy B is resistant to attacks by HCl.

Care should be taken in choosing the seal and the maximum working pressure to ensure that the seal does not fail owing to fatigue. The working pressure in fact causes bending stresses in the seal. It is accordingly important how often (=n) the working pressure can be applied to the construction before the seal fails owing to the bending stresses.

The bending stresses in the seal according to the invention can be controlled such that 100,000 load changes are achievable. The sealing pressure should then preferably remain below 900 N/mm² and be above 500 N/mm² in the case of stainless steel.

The compression pressures mentioned above are the pressures in the seal after mounting in the zero-load condition or assembling condition. Once the seal has been made and tightened, it may be unloaded to a compression pressure in the sealing surface of 140 N/mm² at a working pressure of approximately 100 bar, i.e. to the internal pressure arising from stretch of the bolts and bending of the parts to be fastened. So this is considerably lower than the pressures required for making the seal tight.

To obtain a good sealing effect, the seal must not slide over the surface owing to internal pressure (caused by stretching of the diameter of the seal by the internal pressure). The metal connection would be damaged by this and start to leak. The seal according to the invention is to be regarded as an abutment joint (=hinging, not sliding) or as being clamped onto the surface. These two loading situations are much more favorable for the seal as regards loading than the situation in which it can slide, with the result that a working pressure of 100 bar is admissible. The wall thickness of the seal need not be made greater in principle for greater diameters if the height is sufficiently small.

The frictional force of the sealing surface required for preventing sliding of the seal is no more than 4.7 N/mm (force at the circumference) at 100 bar if the height is sufficiently small. This value holds both for the clamped and for the abutted situation and is independent of the seal diameter because of the very small length of the seal.

Assuming a very low friction coefficient of 0.12 for stainless steel, this results in a required minimum compression in the seal under discussion here of at most 140 N/mm². In the overpressure testing situation (1.5 times the working pressure) this is at most 220 N/mm². The friction coefficient will be much higher in practice owing to flowing of materials into one another, and the required minimum compression will be lower by a factor 2 to 3.

The end face 22 of the seal 21 is flat. The advantage of a flat edge over a rounded one is that a flat edge is easier to turn into a planar shape than an edge with a radius (=rounded edge). The planarity is also easier to measure. The average sealing pressure of a flat edge can be chosen in a more controlled manner within the desired range of 500 to 900 N/mm² (for stainless steel). A rounded sealing edge is less easily deformed (the force required for sealing usually rises considerably after sealing four times in the case of a rounded edge), leading to rejects in re-assembly. This is caused inter alia by the non-planarity of the seal.

FIGS. 8A and 8B show two modifications of a collar configuration according to the invention which are simpler than the configuration of FIG. 6.

FIG. 8A shows a collar 26 with a narrowed end (seal) 27. The non-narrowed portion 28 is straight and its outer wall 29 at the same time forms a centering surface by means of which the collar 26 accurately bears on the upright wall 30 of a centering chamber 31 in an opposite part 32.

FIG. 8B shows a comparable collar configuration. Here, however, the transition from the narrowed end 33 to the non-narrowed portion 34 is formed by a sloping surface 35 and not at right angles as in FIG. 8A. This embodiment provides a more favorable deformation possibility with less risk of buckling. The risk of the centering surfaces getting jammed owing to deformation of their collar portions is limited in these configurations at sealing pressures that are not excessively high.

FIG. 8C shows a collar configuration 36 in a chamber 37 where an intermediate portion with a wall thickness H' merges into a narrowed end via a sloping surface V' at the inner side. A centering surface 41 is formed at the portion 40 of greatest wall thickness (this is in fact the mirrored image of FIG. 6).

FIG. 9 shows an alternative collar shape 48 with a narrowed end 51 having a flat end face 52 with a wall thickness d. A radially projecting portion 53, at which a centering surface 54 is formed, adjoins the narrowed end 51. The outer wall of the collar 48 is provided with a notch 56 in radial direction between the projecting portion 53 and the mating surface 55, which notch is formed for defining at least in part an effective minimum thickness d' of the collar 48. The notch 56 is, for example, V-shaped or extends more or less along a radius. The V-shape should be sufficiently narrow or the radius sufficiently small, as applicable, so as to prevent buckling of the shrinkage part. A locating edge 57 serves to facilitate the joining together. The height of the collar configuration of FIG. 9 may be less than that of the configuration of FIG. 6, for example 1.5 mm as against 2 mm.

It is noted that the mutually facing mating surfaces of the components of the sealing assembly must not make contact with one another when the bolts are tightened, i.e. there is no abutment upon tightening. The full pressure is brought to bear on the seal. This implies that the centering chamber also has a safety function if the seal should collapse.

Figure 10:
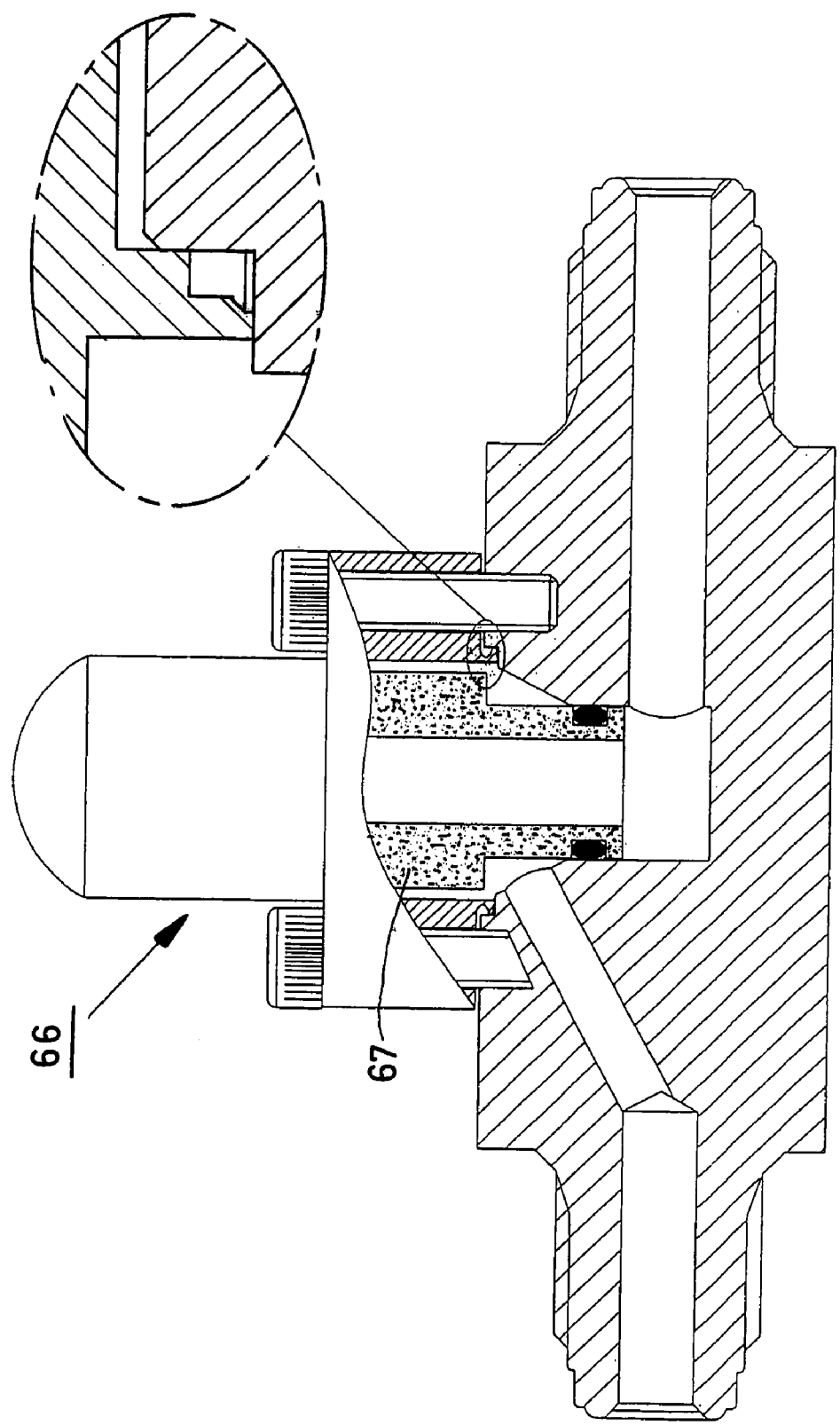

FIG. 10 shows a filter 66 with a filter element 67, and FIG. 11 a pressure meter 68 with a pressure-sensing element 69, wherein a sealing assembly according to the invention is used. As is visible in the insets, a collar-chamber construction of the type of FIG. 6 is used in both cases.

Summarizing, the invention relates to a sealing assembly, for example forming part of a flowmeter. The sealing assembly comprises a first metal body with a mating surface in which a centering chamber with a flat bottom and an upright wall are provided, and a second metal body with a mating surface provided with an annular collar having a narrowed end and a centering surface that bears on the upright wall of the chamber. Bolts couple the two bodies in a detachable manner under deformation of the collar such that the mutually facing mating surfaces do not touch each other.

The invention claimed is:

1. A sealing assembly comprising a first metal body with a first sealing surface, a second metal body with a second sealing surface, and coupling means for detachably coupling the first and the second body to one another under axial compression,
    characterized in that the first body, in a mating surface thereof, is provided with a rounded centering chamber with a flat bottom and an upright wall, which bottom constitutes the first sealing surface, and in that the second body is provided with an annular collar raised from a mating surface, which collar has an inner and an outer wall and a narrowed end portion, said narrowed end portion having a flat end face that forms the second sealing surface, wherein the outer wall of the collar has a centering surface that abuts against the upright wall of the centering chamber in the first body, wherein the coupling means directly press the second sealing surface against the first sealing surface to form a metal-to-metal pressure seal, and wherein the narrowed end of the collar bulges outwards.

2. A sealing assembly as claimed in claim 1, characterized in that the first and the second body are provided with mutually cooperating alignment means at the outer side of the centering chamber so as to guarantee that the relative positions of the first and the second body are reproducible upon re-assembly.

3. A sealing assembly as claimed in claim 2, characterized in that the alignment means comprise a number of bolt holes in the first and second bodies, which holes are mutually aligned in pairs, with bolts passed through them so as to form the coupling means.

4. A sealing assembly as claimed in claim 1, characterized in that the collar comprises a portion that projects radially outwards, at which portion the centering surface is formed.

5. A sealing assembly as claimed in claim 1, characterized in that the material of the collar is chosen from the group comprising soft steel types and metals.

6. A sealing assembly as claimed in claim 1, characterized in that the narrowing of said narrowed end portion enables plastic deformation of said narrowed end portion under axial compression.

7. A sealing assembly comprising a first metal body with a first sealing surface, a second metal body with a second sealing surface, and coupling means for detachably coupling the first and the second body to one another under axial compression,
    characterized in that the first body, in a mating surface thereof, is provided with a rounded centering chamber with a flat bottom and an upright wall, which bottom constitutes the first sealing surface, and in that the second body is provided with an annular collar raised from a mating surface, which collar has an inner and an outer wall and a narrowed end portion, said narrowed end portion having a flat end face that forms the second sealing surface, wherein the outer wall of the collar has a centering surface that abuts against the upright wall of the centering chamber in the first body, wherein the coupling means directly press the second sealing surface against the first sealing surface to form a metal-to-metal pressure seal, wherein the collar comprises a portion that projects radially outwards, at which portion the centering surface is formed, and wherein the projecting portion of the annular collar at which the centering surface is formed extends from the narrowed end up to the mating surface.

8. A sealing assembly as claimed in claim 7, characterized in that the radially projecting portion merges into the narrowed end via a sloping surface.

9. A sealing assembly comprising a first metal body with a first sealing surface, a second metal body with a second sealing surface, and coupling means for detachably coupling the first and the second body to one another under axial compression,
    characterized in that the first body, in a mating surface thereof, is provided with a rounded centering chamber with a flat bottom and an upright wall, which bottom constitutes the first sealing surface, and in that the second body is provided with an annular collar raised from a mating surface, which collar has an inner and an outer wall and a narrowed end portion, said narrowed end portion having a flat end face that forms the second sealing surface, wherein the outer wall of the collar has a centering surface that abuts against the upright wall of the centering chamber in the first body, wherein the coupling means directly press the second sealing surface against the first sealing surface to form a metal-tometal pressure seal, wherein the collar comprises a portion that projects radially outwards, at which portion the centering surface is formed, and wherein the collar is provided with an intermediate portion having an intermediate wall thickness between the projecting portion and the narrowed end.

10. A sealing assembly as claimed in claim 9, characterized in that the intermediate portion merges into the narrowed end via a sloping surface.

11. A sealing assembly comprising a first metal body with a first sealing surface, a second metal body with a second sealing surface, and coupling means for detachably coupling the first and the second body to one another under axial compression,
    characterized in that the first body, in a mating surface thereof, is provided with a rounded centering chamber with a flat bottom and an upright wall, which bottom constitutes the first sealing surface, and in that the second body is provided with an annular collar raised from a mating surface, which collar has an inner and an outer wall and a narrowed end portion, said narrowed end portion having a flat end face that forms the second sealing surface, wherein the outer wall of the collar has a centering surface that abuts against the upright wall of the centering chamber in the first body, wherein the coupling means directly press the second sealing surface against the first sealing surface to form a metal-tometal pressure seal, wherein the collar comprises a portion that projects radially outwards, at which portion the centering surface is formed, and wherein the inner or outer wall of the annular collar is provided with a notch in radial direction between the projecting portion of the collar at which the centering surface is formed and the mating surface so as to define at least in part an effective minimum wall thickness of the collar.

12. A sealing assembly as claimed in claim 11, characterized in that the minimum wall thickness of the collar is equal to or smaller than the minimum wall thickness of the narrowed end.

* * * * *